United States Patent

[11] 3,559,900

[72] Inventors Yuho Harada;
Kenzo Hiramatsu, Omiya-shi, Japan
[21] Appl. No. 804,174
[22] Filed Mar. 4, 1969
[45] Patented Feb. 2, 1971
[73] Assignee Fuji Photo Optical Co. Ltd.
Omiya-shi, Japan
[32] Priority Mar. 6, 1968
[33] Japan
[31] 43/14,430

[54] FIBER-ALIGNING DEVICE
6 Claims, 12 Drawing Figs.
[52] U.S. Cl. .................................................. 242/18,
242/117, 242/54, 242/47
[51] Int. Cl. ........................................ B65h 54/02,
B65h 75/18
[50] Field of Search .......................................... 242/18, 54,
117, 47, 47.01—47.13

[56] References Cited
UNITED STATES PATENTS
2,381,643 8/1945 Bruenner ..................... 242/47.09X
2,599,603 6/1952 Barker ......................... 242/47.09X
2,883,733 4/1959 Notarbartolo et al. ....... 242/47.09X
3,020,621 2/1962 Sacks .......................... 242/47.09UX
3,506,208 4/1970 Davy et al. ................... 242/18

Primary Examiner—Stanley N. Gilreath
Attorney—Sughrue, Rothwell, Mion, Zinn & Macpeak ABSTRACT: An alignment device used during the winding of optical fibers on a takeup drum, a portion of the periphery of the takeup drum is arranged to form an inclined plane or surface which angles inwardly towards the axis of rotation of the drum. The inclined surface provides arrangement of the individual fiber windings into aligned engagement with adjacent fibers arranged on the periphery of the drum.

INVENTORS.
YUHO HARADA
KENZO HIRAMATSU

ATTORNEYS.

INVENTORS.
YUHO HARADA
KENZO HIRAMATSU

BY *Sughrue, Rothwell, Mion, Zinn & Macpeak*

ATTORNEYS.

FIBER-ALIGNING DEVICE

BACKGROUND OF THE INVENTION

The present invention relates to a fiber-aligning device used when winding up an optical fiber or the like on a takeup drum and ensuring that every winding on the wound-up fiber is aligned with every other winding thereof on the periphery of the drum.

In conventional fiber windup devices the individual windings of the fiber are moved in a direction parallel to the axis of rotation of the takeup drum as the drum rotates such that the adjacent windings of the windup fiber on the drum are in contact with each other. In these prior art devices as described above, extremely accurate and complicated alignment mechanisms were required to prevent the misalignment of the adjacent windings. Movement of the fibers in an axial direction at too fast a speed resulted in an undesirable spacing between the adjacent windings, while movement in the axial direction at too slow a speed resulted in the adjacent windings being piled on top of one another. Consequently, the moving speed of the fiber in a direction parallel to the axis of rotation of the drum should be proportional to the rotating speed of the drum on which the fiber is wound so that the adjacent fiber windings on the drum may be in properly aligned contact with each other.

SUMMARY OF THE INVENTION

The present invention eliminates the necessity of complicated and, consequently, expensive alignment devices used when winding up optical fibers or the like. The present invention accomplishes this by providing a simple drum for winding up the fiber wherein a section of the periphery of the drum has an inclined plane or surface portion angled inwardly toward the axis of rotation of the drum. As the fiber is wound upon the drum it is naturally guided along the inclined surface of the periphery of the drum such that every winding on the drum is arranged in properly adjacent alignment. Therefore, the present invention provides a simple fiber-aligning device for winding up an optical fiber and making the individual windings of the fiber aligned with every other winding on the drum so that adjacent fiber windings may be in properly adjacent contact with each other.

BRIEF DESCRIPTION OF THE DRAWINGS

FIG. 5b is a cross-sectional view of the part of the fiber-aligning device of this invention taken along the line 5b–5b in FIG. 5a;

FIG. 6a is a perspective view of the part of the fiber-aligning device in accordance with the present invention with the fiber being in a different position from that shown in FIG. 5a;

FIG. 6b is a cross-sectional view of the part shown in FIG. 6a taken along the line 6b–6b in FIG. 6a;

FIG. 7b is a cross-sectional view taken along the line 7b–7b in FIG. 7a;

DESCRIPTION OF THE PREFERRED EMBODIMENTS

Figure 1:
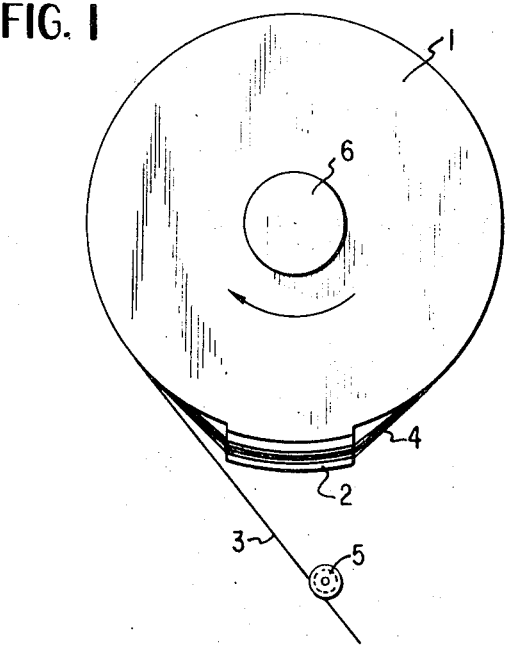
FIG. 1 is a plan view of the fiber aligning device in accordance with the present invention.
Figure 2:
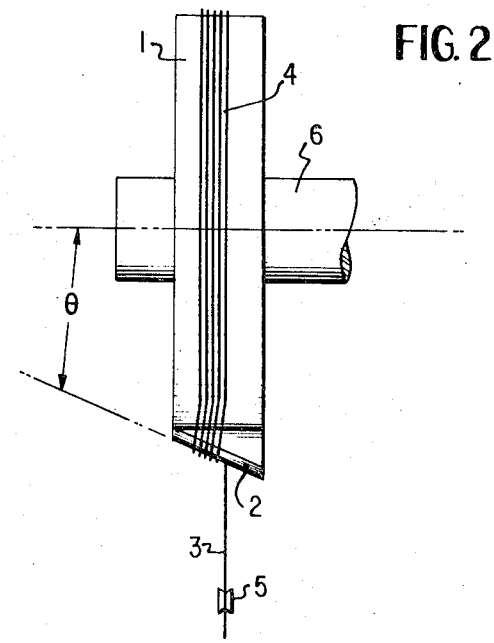
FIG. 2 is a side view thereof.
Figure 3:
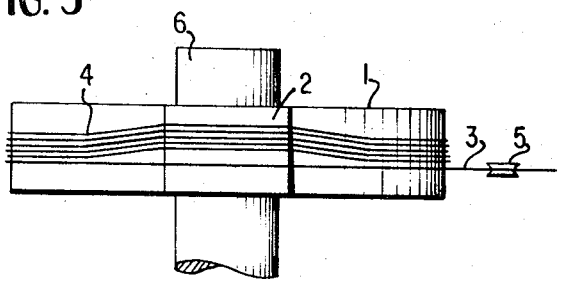
FIG. 3 is a front view thereof.
Figure 4:
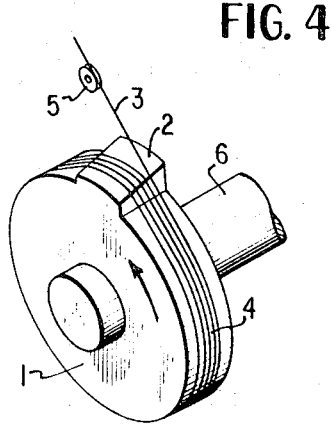
FIG. 4 is a perspective view thereof.

Now referring to the drawings, the reference numeral 1 indicates a windup drum for taking up or winding the optical fiber by rotation thereof. An inclined surface 2 is provided along the periphery of the windup drum 1 and mounted so as to protrude out from the periphery of the drum to some extent. An optical fiber 3 is wound upon the takeup drum 1 so as to form a plurality of windings 4 along the periphery of the drum 1. A guiding roller 5 may be provided for guiding the fiber 3 on the takeup drum, as the drum rotates on a shaft 6 on which it is mounted. The inclined surface 2 of the drum is inclined at an angle (FIG. 2) relative to the axis of rotation of the takeup drum 1.

Figure 5A:
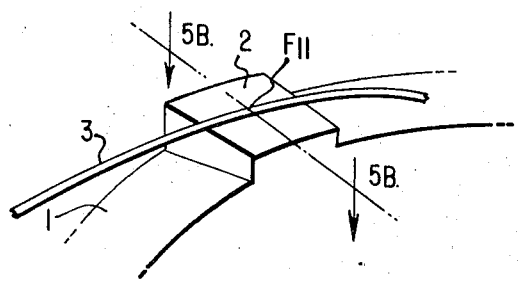
FIG. 5a is a perspective view of a part of the fiber-aligning device in accordance with the present invention for explaining the principle utilized in the present invention.
Figure 5B:
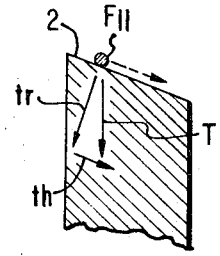

As best shown in FIGS. 5a and 5b, when the fiber is wound on the drum 1 by rotating the drum, there is provided a dynamic action on the drum surface. At the first rotation of the drum, when the fiber 3 is tensioned over the inclined surface 2, a force T is exerted at the position $F_{11}$ on the cone surface in the perpendicular direction to the shaft 6. This is caused by the tension of the fiber 3. The magnitude of the force T depends upon the tension of the fiber 3 and the curvature of the inclined surface 2. The force T is divided into a component $tr$ in the perpendicular direction to the surface 2 and a component $th$ in the parallel direction to the surface 2.

Figure 6A:
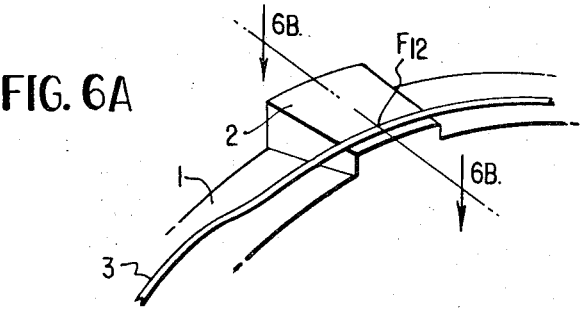
Figure 6B:
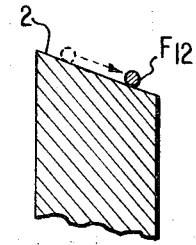

As best shown in FIGS. 6a and 6b, the fiber 3 on the inclined surface 2 is shifted in a downwardly inclined direction of the inclined surface by the component $th$ as the fiber takeup drum 1 is rotated from the condition as shown in FIG. 5a. Thus, the fiber 3 on the inclined cone surface 2 is shifted and stopped at the position $F_{12}$ which is determined by the friction between the surface 2 and the fiber 3 and by the angle $\Theta$ of the incline. According to our experiment, the optimum angle for the angle $\Theta$ of incline is between 10° and 30°.

Figure 7A:
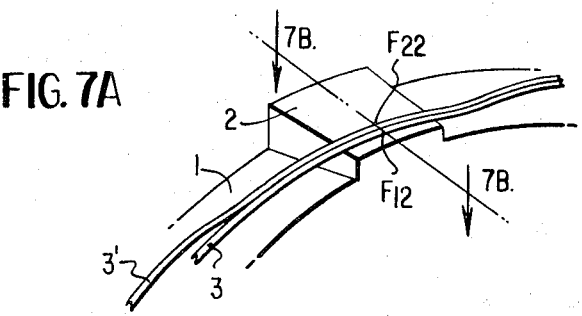
FIG. 7a is a perspective view of the part of the fiber aligning device as shown in FIG. 5a with the fiber in a different position.
Figure 7B:
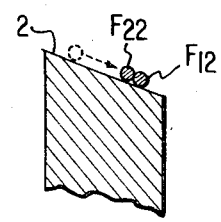

As shown in FIGS. 7a and 7b, the second winding 3' of the fiber 3 tensioned on the inclined surface 2 is shifted thereon as the first winding described above and shown in FIGS. 6a and 6b. Since the first winding of fiber 3 is wound thereon at the position $F_{12}$, the second winding 3' is stopped at the position adjacent to the first winding at the position $F_{22}$. The second winding also has exerted thereon the normal force component $tr$ when shifted, consequently, the second winding of the fiber will never move over the first winding. Thus, the fiber is wound on the takeup drum being aligned so that the windings of the fiber are aligned in contact with each other on the inclined surface of the drum.

Figure 8:
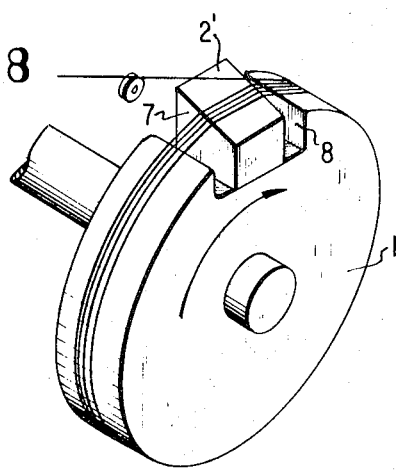
FIG. 8 is a perspective view of the fiber-aligning device in accordance with still another embodiment of the present invention.
Figure 9:
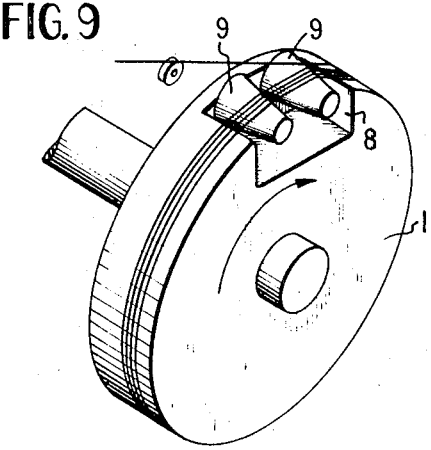
FIG. 9 is a perspective view of the fiber-aligning device in accordance with still another embodiment of the present invention.

FIGS. 8 and 9 show other embodiments of the present invention wherein the fiber 3 wound on the drum is partly bowed along the periphery of the drum. In the embodiment shown in FIG. 8, a plane surface 2' which is inclined toward the rotating shaft 6 is provided on the drum. The plane surface 2' is formed on a member 7 mounted in a recessed portion 8 of the drum. In the embodiment shown in FIG. 9, a plurality of taper pins 9 are mounted in a recessed portion 8' on the periphery of the drum 1 so that an inclined surface may be provided on the periphery of the drum 1. The fiber windings 3 are shifted on the inclined surfaces of the taper pins 9 and thereby wound in alignment with each other thereon. In the latter embodiment shown in FIG. 9, the taper pins 9 are able to be replaced by ordinary cylindrical pins inclined toward the rotating shaft.

As described above, in accordance with the present invention, when the windup drum 1 is rotated $n$ times, $n$ windings of fiber are aligned in contact with the adjacent windings on an inclined surface of the drum. The fiber is guided naturally on the surface to the position where the fiber windings are brought into contact with the adjacent windings, already on the drum, by the action of the force component $tr$. Thus a simply constructed fiber aligning device is obtained without employing any complicated feeding device.

I claim:

1. A fiber-aligning device of the type used to align a plurality of fiber windings, the device comprising: a rotatable shaft, a takeup drum rotatably mounted on the shaft, a member integrally mounted on the periphery of the drum wherein the member is incongruous to the remaining peripheral surface of the drum, an incline surface formed on the incongruous peripheral member, the inclined surface being inclined toward the axis of rotation of the drum, whereby the individual fiber windings arranged on said drum are automatically shifted into aligned engagement with adjacent windings on the drum due to the inclined surface being formed at a predetermined angle relative to the axis of rotation of the drum.

2. A fiber-aligning device as in claim 1 wherein the incongruous peripheral member extends upwardly from the peripheral surface of the drum.

3. A fiber-aligning device as in claim 1 further comprising: a recess formed in the peripheral surface of the drum, the incongruous peripheral member mounted in the recess, the inclined surface formed on the incongruous peripheral member such that the inclined surface extends above the remaining peripheral surface of the drum.

4. A fiber-aligning device as in claim 3 where the incongruous member is removably mounted in the recess.

5. A fiber-aligning device as in claim 1 further comprising: a recess formed in the peripheral surface of the drum, the incongruous member comprising at least one pin mounted within the recess, the pin including an inclined surface mounted thereon and being inclined toward the axis of rotation of the drum.

6. A fiber-aligning device as in claim 1 wherein the angle of inclination of the inclined surface is between 10° and 30°.